(12) United States Patent
Chang

(10) Patent No.: US 7,390,182 B2
(45) Date of Patent: Jun. 24, 2008

(54) ROTOR STRUCTURE OF PNEUMATIC TOOL

(76) Inventor: Jen-Chih Chang, No. 252, Wuguang Rd., Wurih Township, Taichung County 414 (TW)

( * ) Notice: Subject to any disclaimer, the term of this patent is extended or adjusted under 35 U.S.C. 154(b) by 400 days.

(21) Appl. No.: 11/204,017

(22) Filed: Aug. 16, 2005

(65) Prior Publication Data
US 2007/0042690 A1 Feb. 22, 2007

(51) Int. Cl.
*F01C 21/00* (2006.01)
*F03C 2/00* (2006.01)
*F04C 2/00* (2006.01)

(52) U.S. Cl. .................. 418/270; 418/140; 418/259; 418/268

(58) Field of Classification Search ............... 418/270, 418/178, 257, 259, 266–268, 140
See application file for complete search history.

(56) References Cited
U.S. PATENT DOCUMENTS 589,006 A * 8/1897 Manning .................. 418/270
3,356,292 A * 12/1967 Brewer et al. ............. 418/152
4,898,524 A * 2/1990 Butzen .................... 418/259
5,954,489 A * 9/1999 Kinoshita ................. 418/270
6,821,099 B2 * 11/2004 Wilk et al. ................ 418/259

FOREIGN PATENT DOCUMENTS

JP 60098190 A * 6/1985 ............. 418/270

* cited by examiner

*Primary Examiner*—Theresa Trieu
(74) *Attorney, Agent, or Firm*—Rosenberg, Klein & Lee

(57) ABSTRACT

A rotor structure of pneumatic grinder, including a rotor main body and at least one reinforcing plate. The rotor main body is formed with a central shaft hole for a rotary shaft to pass through. Several radial projecting sections are formed on outer circumference of the rotor main body at equal intervals. Each projecting section has a depression for reducing the weight of the rotor structure. A split is defined between each two adjacent projecting sections. A vane is inserted in each split. The reinforcing plate is coaxially embedded in the rotor main body. The reinforcing plate outward radially expands from the axis of the rotor main body for increasing the strength of the rotor main body.

2 Claims, 6 Drawing Sheets

US 7,390,182 B2

ROTOR STRUCTURE OF PNEUMATIC TOOL

BACKGROUND OF THE INVENTION

The present invention is related to a rotor structure of pneumatic grinder, which has higher strength.

FIG. 9 shows a conventional plastic rotor structure made by injection molding. The rotor structure has a rotor main body 6 formed with a central shaft hole 61. A rotary shaft (not shown) is fitted through the shaft hole 61. Several radial sector sections 62 are formed on outer circumference of the rotor main body 6 at equal intervals. Each sector section 62 has a depression 63 for reducing the weight of the rotor. A split 64 is defined between each two adjacent sector sections 62. A vane 65 is inserted in each split 64.

The rotor structure is mounted in a pneumatic tool. The vanes 65 bear the air pressure coming from the intake of the pneumatic tool for driving the rotor main body 6 to rotate.

During rotation of the rotor, high air pressure is applied to the vanes. Under such circumstance, the inner ends of the vanes in the splits will exert a very great action force onto the bottom ends of the sector sections. As a result, it often takes place that the bottom ends of the sector sections of the rotor main body fissure. Under such circumstance, the rotor main body will become useless.

Accordingly, it is tried by the applicant to provide a rotor structure having high strength to solve the above problem.

SUMMARY OF THE INVENTION

It is therefore a primary object of the present invention to provide a rotor structure of a pneumatic tool. A reinforcing plate is coaxially embedded in the rotor main body for resisting against the action force applied to the vanes under air pressure. Therefore, the rotor main body has higher strength and will not be fissured or broken due to high air pressure.

According to the above object, the rotor structure of the pneumatic grinder of the present invention includes a rotor main body and at least one reinforcing plate. The rotor main body is formed with a central shaft hole for a rotary shaft to pass through. Several radial projecting sections are formed on outer circumference of the rotor main body at equal intervals. Each projecting section has a depression for reducing the weight of the rotor structure. A split is defined between each two adjacent projecting sections. A vane is inserted in each split. The reinforcing plate is coaxially embedded in the rotor main body. The reinforcing plate outward radially expands from the axis of the rotor main body.

The present invention can be best understood through the following description and accompanying drawings wherein:

DETAILED DESCRIPTION OF THE PREFERRED EMBODIMENTS

Figure 1:
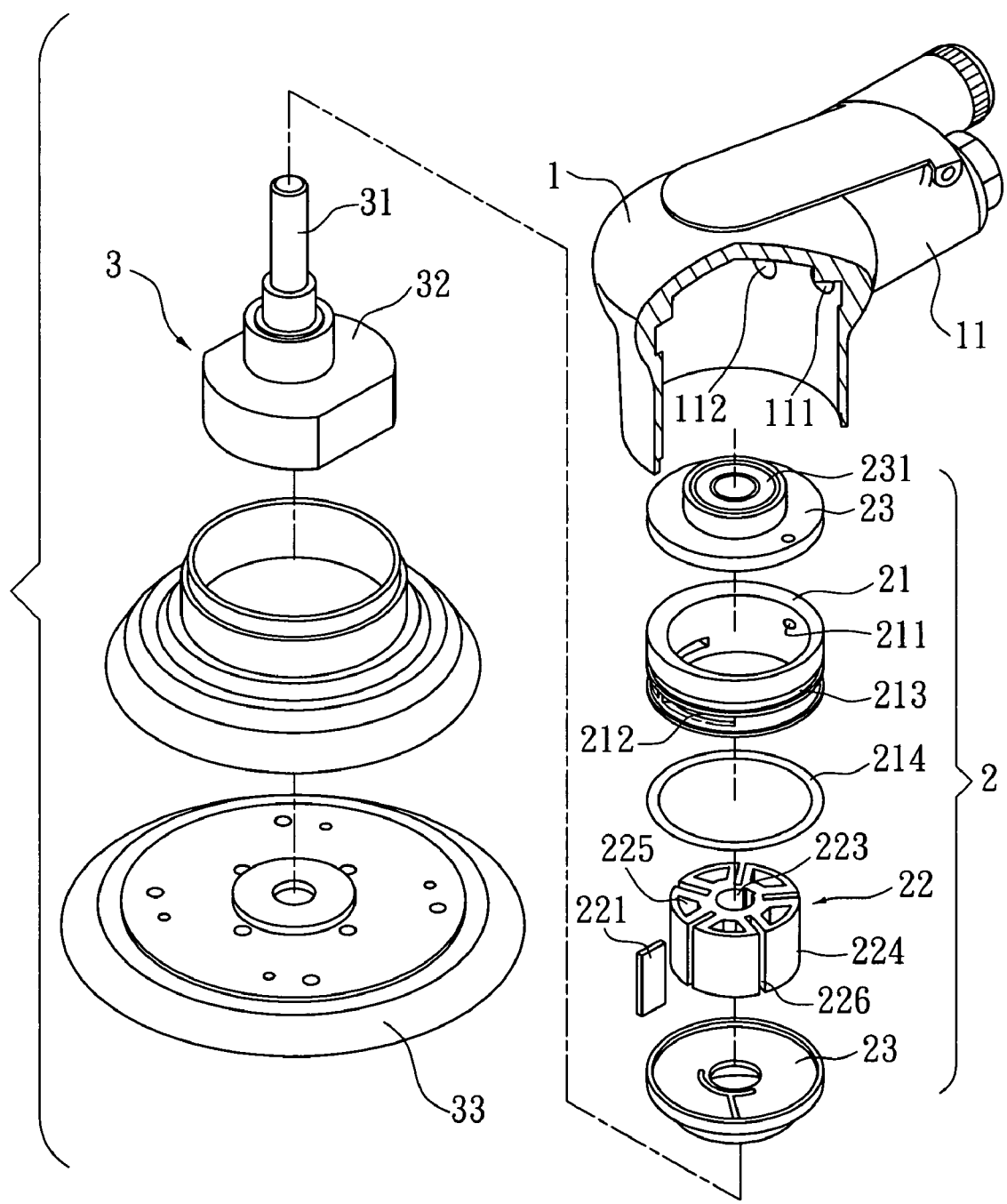
FIG. 1 is a perspective exploded view of a first embodiment of the present invention applied to a pneumatic grinder.

Please refer to FIG. 1. According to a first embodiment, the rotor structure of the present invention is applied to a pneumatic grinder including a housing 1, a pneumatic driving mechanism 2 and a grinding mechanism 3. The housing 1 has a controlling handle 11 on one side. An intake passage 111 and an exhaust passage 112 are transversely formed in the controlling handle 11 in parallel to each other.

Figure 2:
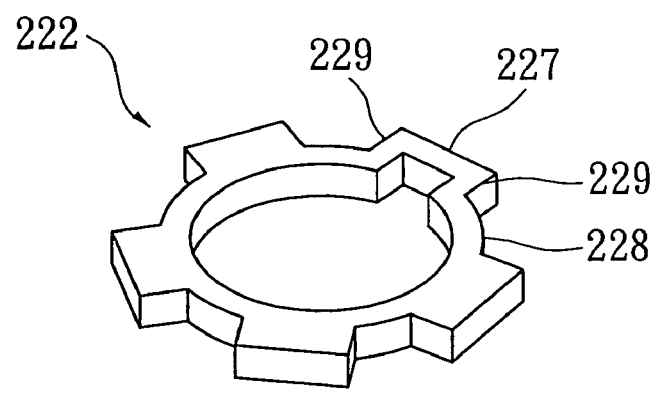
FIG. 2 is a perspective view of the reinforcing plate of the first embodiment of the present invention.
Figure 3:
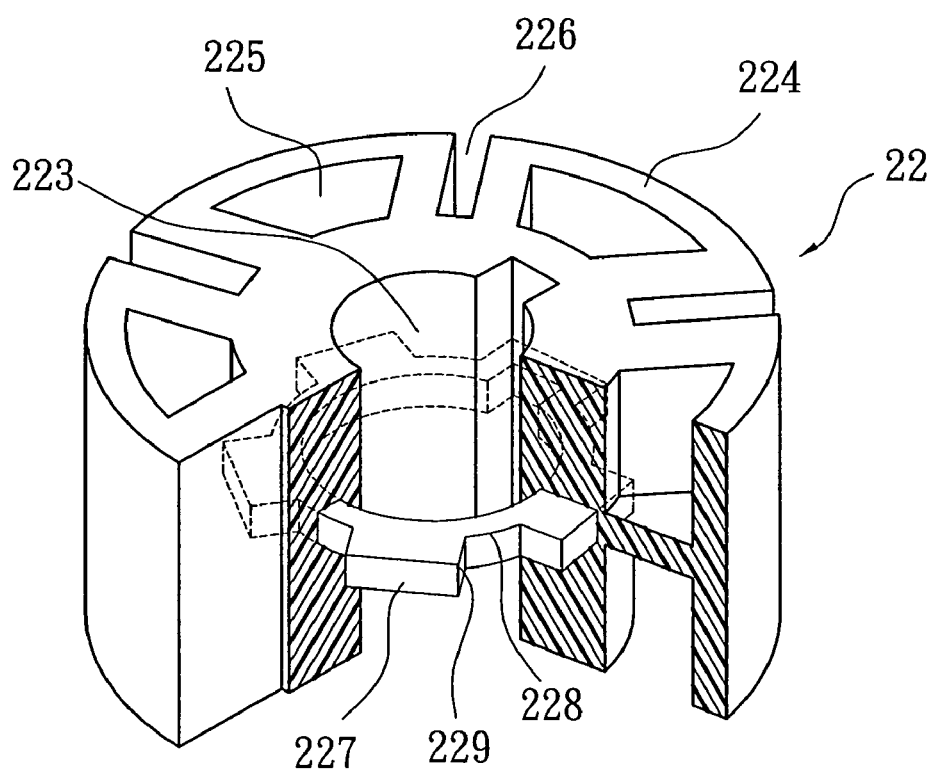
FIG. 3 is a sectional view showing that the reinforcing plate is embedded in the rotor main body.

The pneumatic driving mechanism 2 includes a rotor main body 22 having a reinforcing plate 222. The rotor main body 22 is disposed in a ring body 21 and is formed with a central shaft hole 223 through which a rotary shaft 31 is fitted. Several radial projecting sections 224 are formed on outer circumference of the rotor main body 22 at equal intervals. In this embodiment, the projecting section 224 is sector-shaped and inward tapered. Each projecting section 224 has a depression 225. A split 226 is defined between each two adjacent projecting sections 224. A vane 221 is inserted in each split 226. An outer end of the vane 221 protrudes from the projecting section 224 of the rotor main body 22, while an inner end of the vane 221 is inlaid in the split 226 of the rotor main body 22. The reinforcing plate 222 is coaxially embedded in the rotor main body 22 as shown in FIGS. 2 and 3. The reinforcing plate 222 outward radially expands from the axis of the rotor main body 22. In this embodiment, the reinforcing plate 222 is an iron plate having several protruding sections 227 respectively corresponding to the projecting sections 224. Each protruding section 227 has two straight sides 229. An arc section 228 is connected between each two adjacent protruding sections 227. A middle section of the ring body 21 is formed with an annular groove 213 in which a gasket 214 is inlaid. An intake 211 is transversely formed through the ring body 21 above the annular groove 213. An exhaust port 212 is transversely formed through the ring body 21 below the annular groove 213. The intake 211 and the exhaust port 212 respectively communicate with the intake passage 111 and exhaust passage 112. The upper and lower ends of the ring body 21 are respectively coupled with two bearing seats 23 having bearings 231.

The grinding mechanism 3 includes a rotary shaft 31 passing through the shaft hole 223 of the rotor main body 22. The rotary shaft 31 is longitudinally fitted through the bearings 231 of the bearing seats 23 and the rotor main body 22. When the rotor main body 22 rotates, the rotary shaft 31 is driven and rotated. The bottom end of the rotary shaft 31 has an eccentric block 32. A circular grinding disc 33 is pivotally disposed under the bottom of the eccentric block 32.

Figure 4:
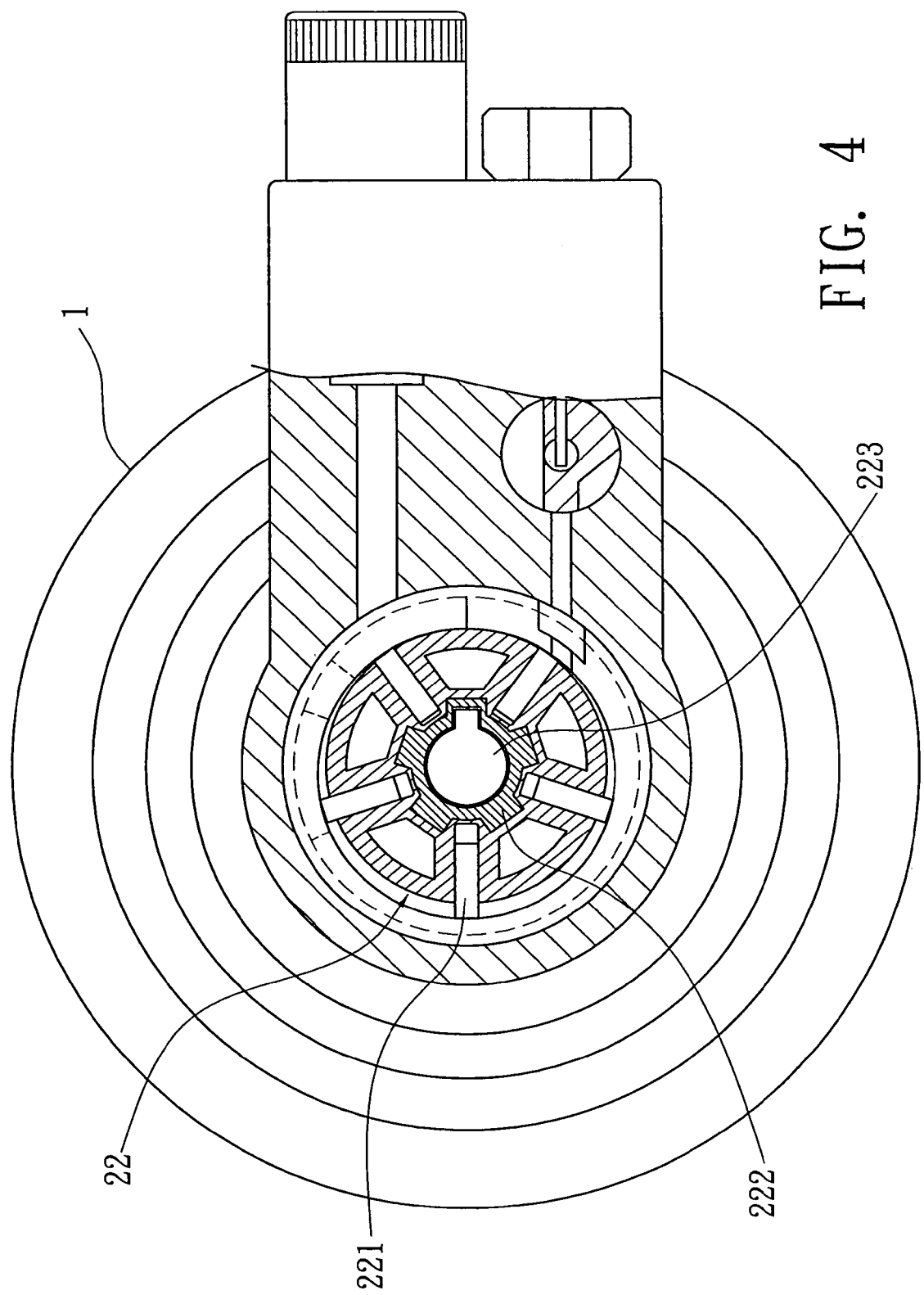
FIG. 4 is a sectional view of the present invention mounted in the pneumatic grinder.

Referring to FIG. 4, when the air goes from the intake passage 111 of the controlling handle 11 through the intake 211 into the ring body 21, the air pressure is applied to outer ends of the vanes 221 of the rotor main body 22 inside the ring body 21. At this time, the projecting section 224 of the rotor main body 22 serves as a fulcrum to achieve a leverage effect. The same air pressure will be transmitted from the vanes 221 to the bottom ends of the projecting sections 224 of the rotor main body 22. Accordingly, the bottom ends of the projecting sections 224 will bear the air pressure to rotate the rotor main body 22. The rotary shaft 31 is then driven and rotated for grinding a work piece.

The reinforcing plate 222 is coaxially embedded in the rotor main body 22 for resisting against the action force applied to the vanes 221. Therefore, the rotor main body 22 has higher strength. When the air pressure is transmitted from the vanes 221 to the bottom ends of the projecting sections 224 of the rotor main body 22, the reinforcing plate 222 can effectively resist against the air pressure. Therefore, the bottom ends of the projecting sections 224 of the rotor main body 22 are protected from being fissured or broken due to insufficient strength.

Figure 5:
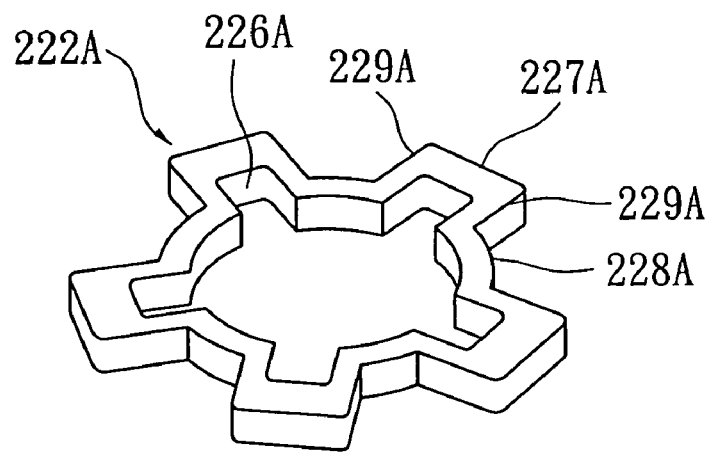
FIG. 5 is a perspective view of the reinforcing plate of a second embodiment of the present invention.
Figure 6:
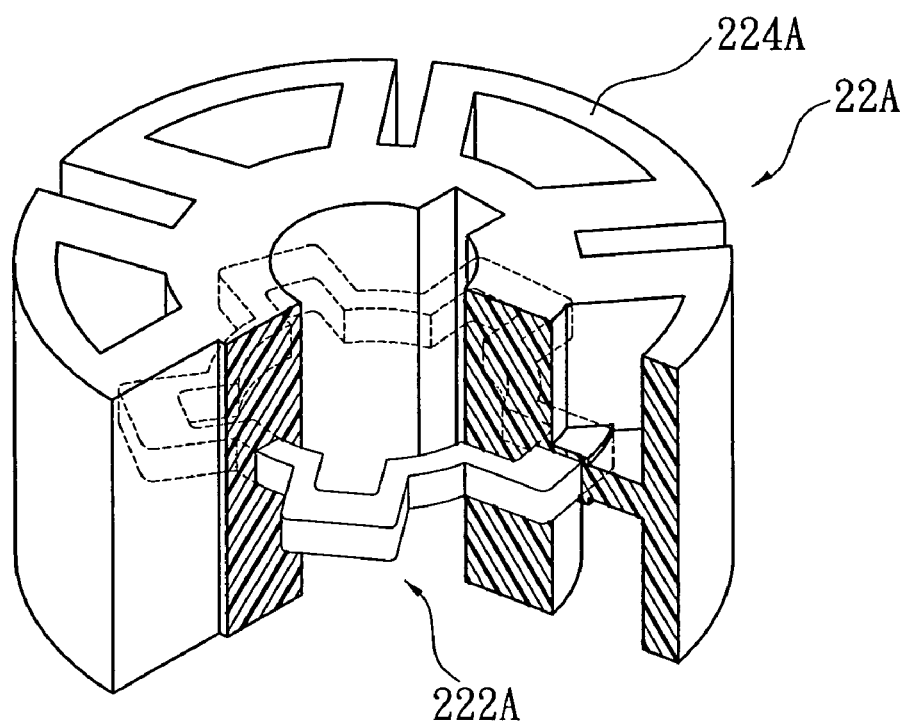
FIG. 6 is a sectional view showing that the reinforcing plate of the second embodiment of the present invention is embedded in the rotor main body.

FIGS. 5 and 6 show a second embodiment of the present invention, in which the reinforcing plate 222A is a hollow plate which is coaxially embedded in the rotor main body 22A. The reinforcing plate 222A outward radially expands from the axis of the rotor main body 22A. In this embodiment, the reinforcing plate 222A is an iron plate having several protruding sections 227A respectively corresponding to the projecting sections 224A. Each protruding section 227A has two straight sides 229A. An arc section 228A is connected between each two adjacent protruding sections 227A. The reinforcing plate 222A is cut along inner sides of the protruding sections 227A, straight sides 229A and arc sections 228A, whereby each protruding section 227A has a notch 226A corresponding to the projecting section 224A.

By means of the notches 226A, the assembly of the reinforcing plate 222A is facilitated. In addition, when making the rotor main body 22A by injection molding, the plastic material will fill up the notches 226A to more firmly bond the reinforcing plate 222A with the rotor main body 22A. This further increases the strength of the rotor main body.

Figure 7:
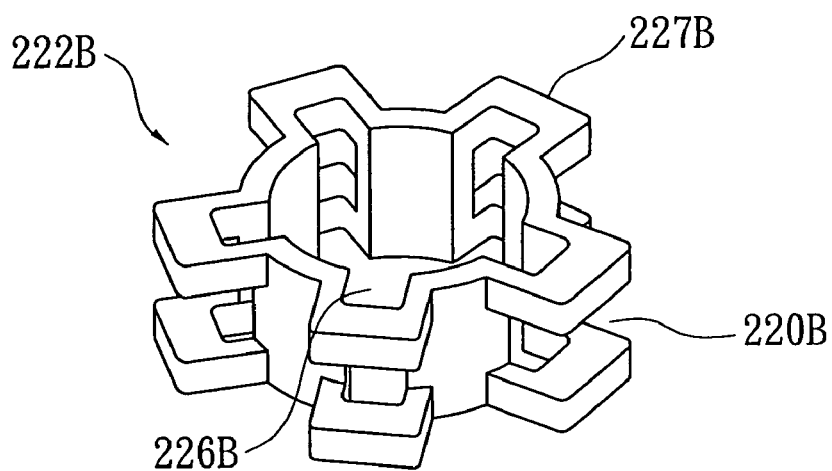
FIG. 7 is a perspective view of the reinforcing plate of a third embodiment of the present invention.
Figure 8:
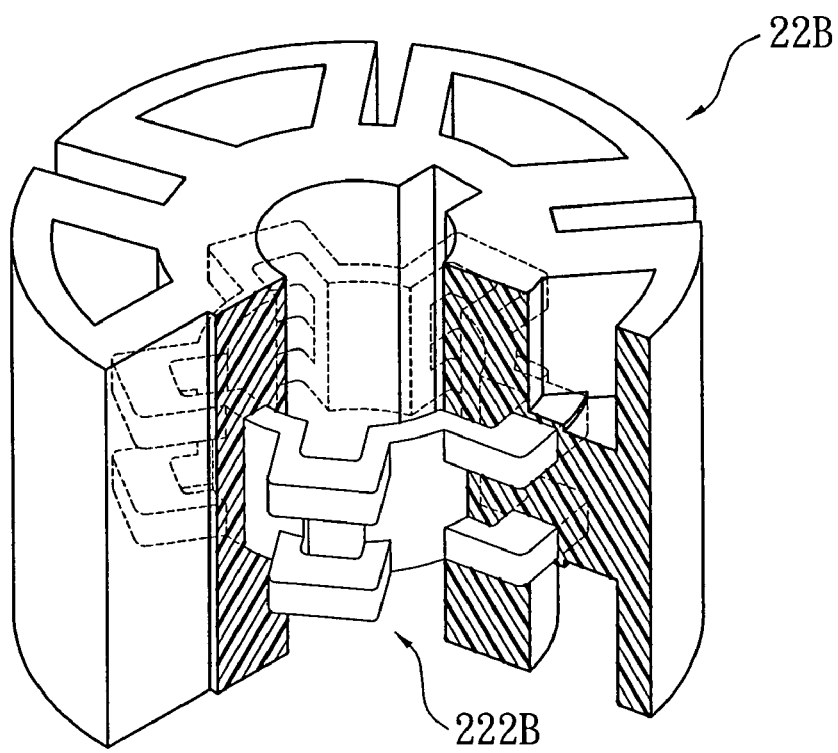
FIG. 8 is a sectional view showing that the reinforcing plate of the third embodiment of the present invention is embedded in the rotor main body.
Figure 9:
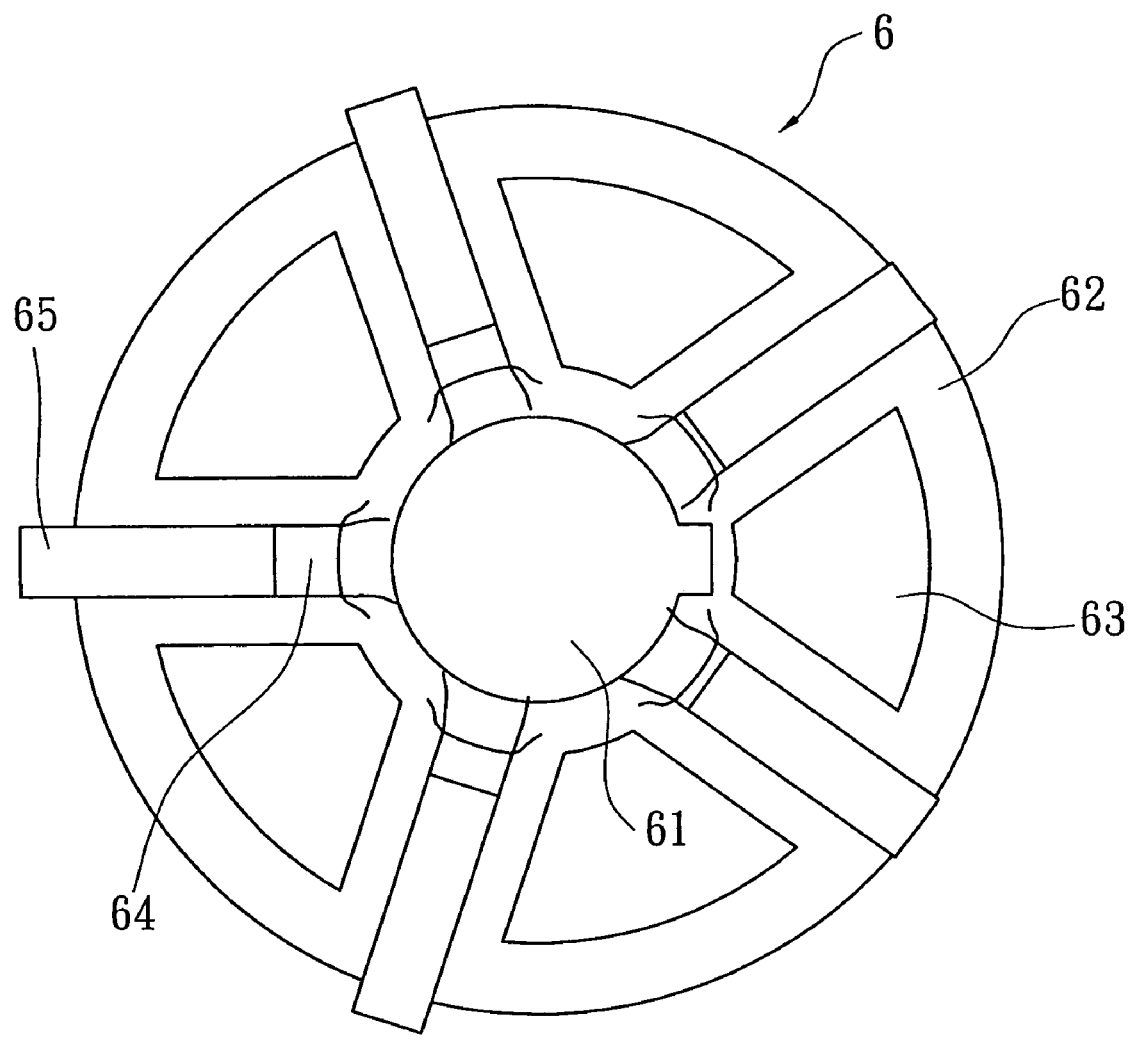
FIG. 9 is a plane view of a conventional rotor structure.

FIGS. 7 and 8 show a third embodiment of the present invention, in which the axial thickness of the reinforcing plate 222B is increased. In addition, an annular groove 220B is formed on the protruding sections 227B to communicate with the notches 226B. This makes the reinforcing plate 222B more firmly bonded with the rotor main body 22B. The thickened reinforcing plate 222B makes the rotor main body 22B have increased strength.

The above embodiments are only used to illustrate the present invention, not intended to limit the scope thereof. Many modifications of the above embodiments can be made without departing from the spirit of the present invention.

What is claimed is:

1. A rotor structure of pneumatic grinder, comprising a rotor main body formed with a central shaft hole for a rotary shaft to pass through, several radial projecting sections being formed on outer circumference of the rotor main body at equal intervals, a split being defined between each two adjacent projecting sections, a vane being inserted in each split, at least one reinforcing plate being coaxially embedded in the rotor main body, the reinforcing plate outward radially expanding from an axis of the rotor main body for increasing the strength of the rotor main body;

wherein the reinforcing plate is a hollow plate, the reinforcing plate having several protruding sections respectively corresponding to the projecting sections of the rotor main body, each protruding section having two straight sides, an arc section being connected between each two adjacent protruding sections, the reinforcing plate being cut alone inner sides of the protruding sections, straight sides and arc sections, whereby each protruding section has a notch corresponding to the projecting section of the rotor main body for facilitating assembly of the reinforcing plate and enhancing bonding between the reinforcing plate and the rotor main body.

2. The rotor structure of the pneumatic tool as claimed in claim 1, wherein the reinforcing plate has a certain thickness and an annular groove is formed on the protruding sections, the annular groove communicating with the notches for enhancing the bonding between the reinforcing plate and the rotor main body.

* * * * *